United States Patent [19]

Rogers

[11] Patent Number: 4,787,731
[45] Date of Patent: Nov. 29, 1988

[54] REVERSIBLE EYEGLASS STRUCTURE

[76] Inventor: James E. Rogers, 3736 SE. 27th, Topeka, Kans. 66605

[21] Appl. No.: 882,834

[22] Filed: Jul. 7, 1986

[51] Int. Cl.⁴ .............................................. G02C 5/14
[52] U.S. Cl. .................................. 351/153; 351/121; 16/228
[58] Field of Search ...................... 351/153, 121, 115; 16/228

[56] References Cited

PUBLICATIONS

Raphael's Ltd, Plastic Reversible Spectacles, Dec. 31, 1948, 351,115.

Primary Examiner—Rodney B. Bovernick
Attorney, Agent, or Firm—Phillip A. Rein

[57] ABSTRACT

This invention is a reversible eyeglass structure having a ear piece support assembly pivotally connected through a hinge connector assembly to an eyeglass frame assembly. The eyeglass frame assembly resembles a normal eyeglass assembly except that the glass sections and the main frame assembly are extended in parallel planes so that the eyeglass lens can be view through reversed directions and a nose bridge member can be used on a person's nose portion in opposite directions. The ear piece support assembly includes a pair of ear piece support members which are constructed in half sections with exterior surfaces of different colors and/or designs. The ear piece support members are pivoted 180 degrees to effectively present two sets of different appearing eyeglass wear in the one reversible eyeglass structure. The hinge connector assembly provides for ear piece and frame connector assemblies interconnected by a pin connector assembly and including biasing means to hold the ear piece support members in both usage conditions. In a second embodiment of a hinge connector assembly, a resilient pin connector assembly is pivoted so as to hold the ear piece support members against the eyeglass frame assembly under resilient pressure in a selected one of the two usage conditions.

6 Claims, 3 Drawing Sheets

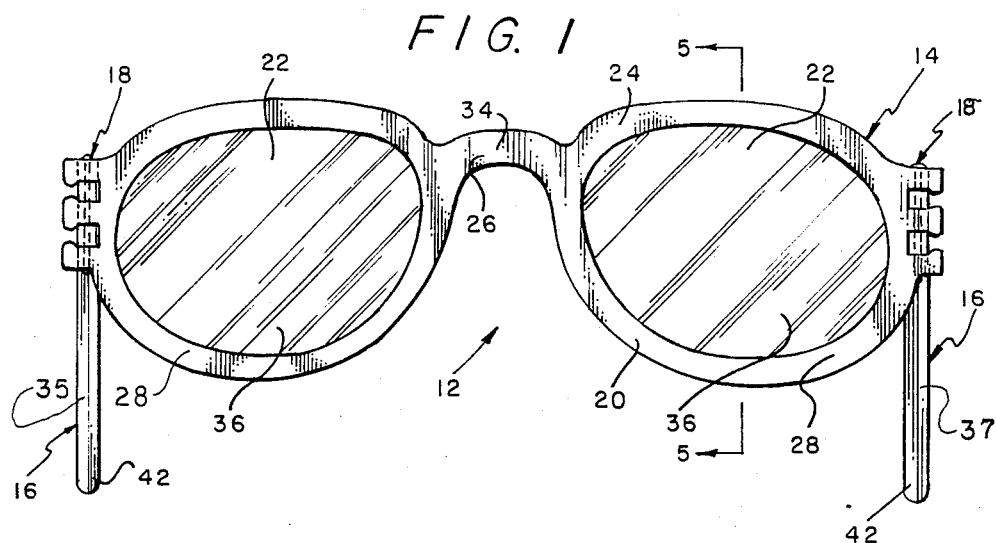
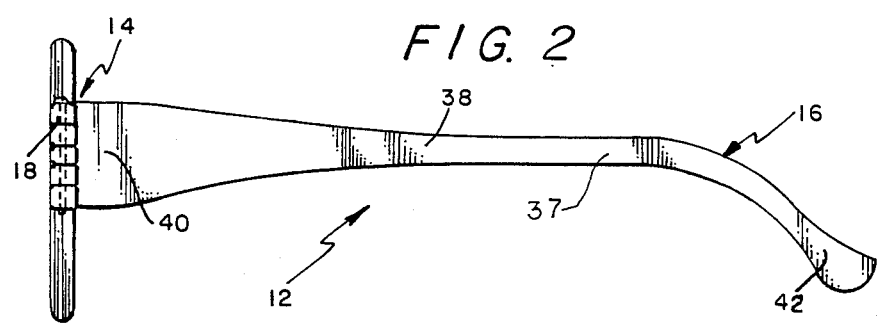
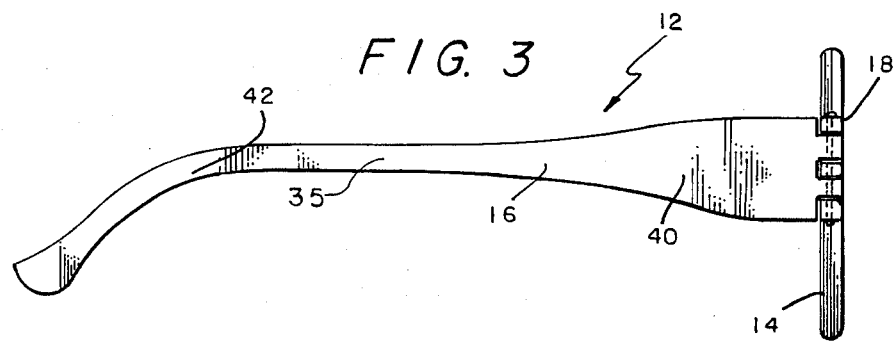
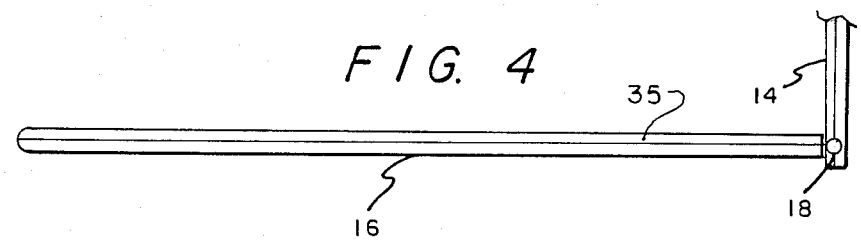

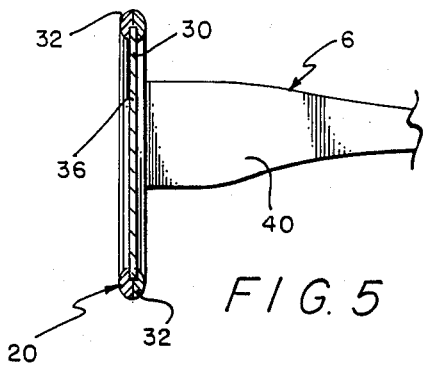
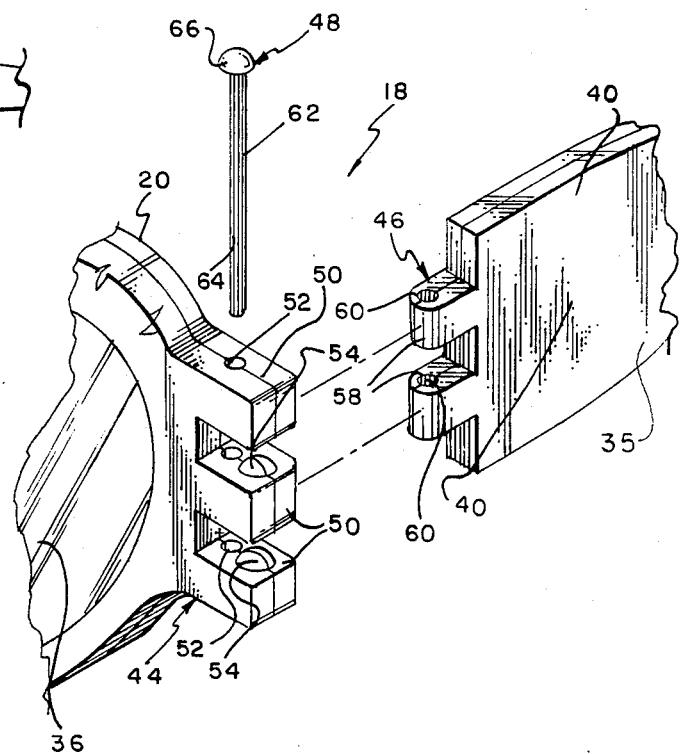
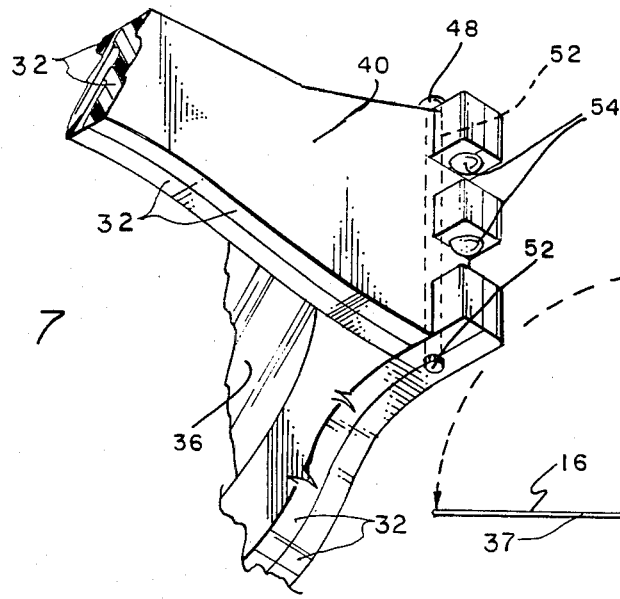
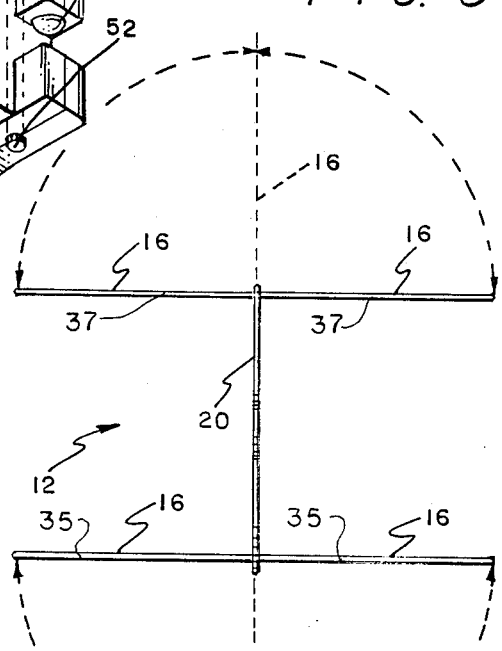
FIG. 5
FIG. 6
FIG. 7
FIG. 8

REVERSIBLE EYEGLASS STRUCTURE

PRIOR ART

A patentability investigation on the above identified invention revealed the following U.S. Patents:

| Reg. No. | Patent | Inventor |
| --- | --- | --- |
| 618,118 | SPECTACLES | Moews |
| 2,746,087 | METHOD OF MANUFACTURE OF SPECTACLES | Dolezal |
| 3,049,974 | EYEGLASS FRAMES AND THE LIKE | Miwa |
| 4,377,327 | SPECTACLE FRAMES | Zomer |
| 4,391,498 | SPECTACLE FRAME | Rengstorff |
| 4,561,735 | EYEGLASS FRAME HINGE | Levoy |

This invention is drawn to reversible eyewear/sunglass structure including the features of (1) a special hinge structure to allow the ear pieces to be rotated 180 degrees for extention in opposite different directions for dual usage; (2) the coloring on the eyeglass frame is such that the eyeglasses are a different color when the ear pieces are rotated from one usage direction to the other; (3) a special nose piece is usable in either reversed direction; and (4) the lens would be a flat type so as to be viewed through from either direction.

The Moews patent discloses a hinge structure having a tapered cone member to compensate for wear and resultant looseness in the hinge.

The Zomer patent discloses a spectacle frame having a spacer element therein to allow movement and adjustment in various angles but is not deemed pertinent to this invention.

The Dolezal patent discloses a spectacle member having various hinge structures so as to be adjustable in various manners through the use of a special cold working material.

The Rengstorff patent discloses a frame structure having pivotal hinge members which would be movable substantially 180 degrees with a support band or strap of a flexible material. This structure is not intended to be operable similar to my invention although the hinge structures appear to be rotatable 180 degrees but other features such as the nose piece and the curved hinge members are not similar.

The Yukio Miwa patent discloses an eyeglass frame having the ear pieces foldable in a reverse direction for the purpose of providing a shielding function to prevent scratching of the lens structure. Although the frame is pivotal at least 180 degrees and, in fact, almost 360 degrees, the shape of the nose support and the ear pieces are such that the function or the operability of this patented invention is dissimilar to my invention.

PREFERRED EMBODIMENT OF THE INVENTION

In one preferred embodiment of this invention, a reversible eyeglass structure is provided including (1) an eyeglass frame assembly; (2) an ear piece support assembly connected to the eyeglass frame assembly; and (3) a hinge connector assembly operable to interconnect the ear piece support assembly to the eyeglass frame assembly. The eyeglass frame assembly includes a main frame assembly having a pair of spaced lens members mounted therein. The main frame assembly includes a lens support frame assembly innerconnected by a nose bridge member. The lens support frame assembly resembles a conventional eyeglass frame assembly except having the same extended on opposite sides in parallel planes so that the lens members can be utilized for viewing in either direction. The nose bridge member is, additionally, in a substantially parallel planes on opposite sides so as to be usable in a reversed condition for support on the person's nose structure. The ear piece support assembly includes a pair of ear piece support members, each having a main body with a connector section connected to the hinge connector assembly and, at the opposite end thereof, integral with an ear section to be supported on the user's ear extended in either direction. The ear piece support members have outer surfaces extended in parallel planes so as to be usable when projecting in opposite directions from the main frame assembly. The hinge connector assembly is provided with a frame connector assembly connected to the main frame assembly; an ear piece connector assembly connected to the ear piece support members; and a pin connector assembly. The frame connector assembly is provided with spaced, parallel support lugs and dimple portions which allows the respective ear piece support member to be pivoted from a first usage condition 180 degrees about the respective pin connector assembly so as to be usable in the opposite direction. Another embodiment of the hinge connector assembly is provided having means for resiliently holding the respective ear piece support members in the two usage conditions pivot 180 degrees from each other and perpendicular to the eyeglass frame assembly. The eyeglass frame assembly and the ear piece support assembly are provided with half sections of various colors or designs so that the reversible eyeglass structure of this invention can be utilized on viewing through the lens members in opposite directions. This achieves an eyeglass structure having a frame of different colors such as an outer surface color of red in one position and an outer surface color of white in the other position and many color combinations and/or design can be achieved with the reversible eyeglass structure of this invention.

OBJECTS OF THE INVENTION

One object of this invention is to provide a reversible eyeglass structure having an eyeglass frame assembly with an ear piece support assembly pivotally connected thereto and the ear piece support assembly includes a pair of ear piece support members which are movable from one usage position 180 degrees outwardly therefrom to another usage position to present a different outward appearing frame structure.

One other object of this invention is to provide a reversible eyeglass structure having an eyeglass frame assembly and a pair of ear piece support members pivotally connected to the eyeglass frame assembly constructed of half sections of various colors so as to achieve two different outwardly appearing reversible eyeglass structures.

Still, another object of this invention is to provide a reversible eyeglass structure having a pair of ear piece support members pivotally connected thereto through a hinge connector assembly which provides a biasing feature when the ear piece support members are pivotable 180 degrees from one usage condition to the other in order to hold same in such usage conditions.

Still, one further object of this invention is to provide a reversible eyeglass structure having a pair of ear piece support members connected through a hinge connector assembly to an eyeglass frame assembly and the hinge connector assembly including resilient means thereon to bias respective ones of the earpiece support members to one of two usage conditions being defined as having the ear piece support members perpendicular to the eyeglass frame assembly and pivoted 180 degrees to a second usage condition also perpendicular to the eyeglass frame assembly.

Another object of this invention is to provide a reversible eyeglass structure which is operable in one of two usage positions to present a different outward appearance of the frame structure in color and/or design; sturdy in construction; includes an eyeglass frame assembly which can be viewed from opposite directions; and having a nose bridge member which is operable in reversed conditions to be supported on a person's nose; easy to transform from one usage condition to another; and economical to manufacture.

Various other objects, advantages, and features of the invention will become apparent to those skilled in the art from the following discussion, taken in conjunction with the accompanying drawings, in which:

FIGURES OF THE INVENTION

FIG. 1 is a front elevational view of a reversible eyeglass structure of this invention;

FIG. 2 is a side elevational view thereof;

FIG. 3 is a side elevational view from the side opposite that shown in FIG. 2;

FIG. 4 is a fragmentary top plan view of the reversible eyeglass structure of this invention;

FIG. 5 is a fragmentary sectional view taken along line 5—5 in FIG. 1;

FIG. 6 is an enlarged fragmentary exploded perspective view illustrating a hinge connector assembly of reversible eyeglass structure of this invention;

FIG. 7 is an enlarged fragmentary perspective view taken from a direction opposite the view of FIG. 6 illustrating the hinge connector assembly of the reversible eyeglass structure of this invention;

FIG. 8 is a top plan schematic view illustrating movement of the reversible eyeglass structure of this invention from a first to a second usage position;

Figure 9:
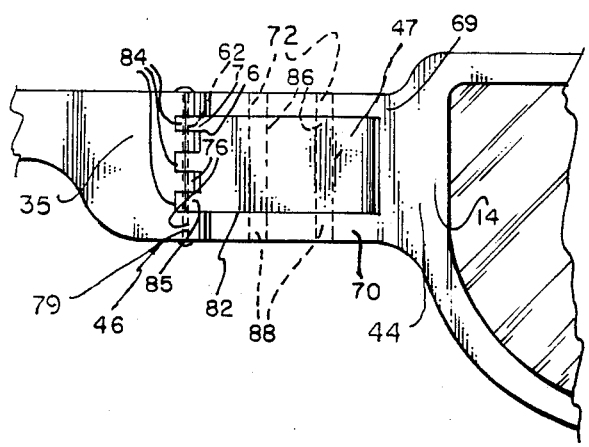
FIG. 9 is a fragmentary front elevational view illustrating a second embodiment of a hinge connector assembly of the reversible eyeglass structure of this invention.
Figure 10:
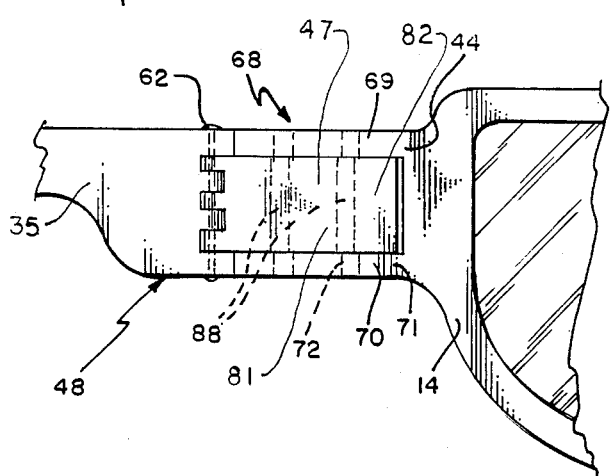
FIG. 10 is a view similar to FIG. 9 illustrating operation of the hinge connector assembly of the second embodiment.

The following is a discussion and description of preferred specific embodiments of the reversible eyeglass structure of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail and, in particular FIGS. 1 and 2, a reversible eyeglass structure of this invention, indicated generally at 12, includes (1) an eyeglass frame assembly 14; (2) ear piece support assembly 16; and (3) a hinge connector assembly 18 operable to pivotally connect the ear piece support assembly 16 to the eyeglass frame assembly 14. The reversible eyeglass structure 12 resembles a convention eyeglass assembly but may be utilized in two usage conditions having a different colored or designed exterior when the ear piece support assembly 16 is pivoted 180 degrees to another usage as will be explained in detail.

The eyeglass frame assembly 14 includes a main frame assembly 20 having a pair of spaced lens members 22 mounted therein. The main frame assembly 20 includes a lens support frame assembly 24 having a nose bridge member 26.

The lens support frame assembly 24 includes pair of spaced oval support members 28. The lens support frame assembly 24 resembles that of a conventional eyeglass assembly except that the oval support members 28 are extended in substantially parallel planes so that the lens members 22 can be viewed therethrough in opposite directions.

As noted in FIG. 5, the oval support members 28 each includes a peripheral groove section 30 to receive the lens members 22 therein. Additionally, the oval support members 28 are constructed of half frame sections 32 so that each half section can be made of a different color or design so as to add to the utility of the reversible eyeglass structure 12 of this invention.

The lens members 22 are of a conventional design except consisting of glass sections 36 extended in parallel planes so as to be functional when viewed through either side thereof.

The ear piece support assembly 16 includes a pair of ear piece support members 35, 37 operable to be placed over a person's respective ear members to support the reversible eyeglass structure 12 similar to a conventional eyeglass assembly.

Each ear piece support member 35, 37 includes a main body section 38 integral at one end thereof with a connector section 40 and, at an opposite end thereof, an ear section 42. The ear section 42 is of a arcuate shape to be placed over the person's ear member for support.

As noted in FIGS. 6 and 7, the hinge connector assembly 18 includes (1) a frame connector assembly 44; (2) an ear piece connector assembly 46; and (3) a pin connector assembly 48 to pivotally connect the frame connector assembly 44 to the ear piece connector assembly 46.

The frame connector assembly 44 includes at each end of the main frame assembly 20 spaced parallel frame support lugs 50. Each of the frame support lugs 50 is provided with aligned connector holes 52 and dimple portions 54. The aligned connector holes 52 are adapted to receive the pin connector assembly 48 therethrough to achieve pivotal connection of the respective ear piece support members 35, 37. The opposed resilient dimple portions 54 are operable to resist and hold the ear piece support members 35, 37 in their various usage conditions in a manner to be explained.

The ear piece connector assembly 46 is provided with spaced, parallel, ear piece support lugs 58. Each ear piece support lug 58 is provided with connector openings 60 aligned with each other to receive the pin connector assembly 48 therethrough when the connector openings 60 are aligned with the connector holes 52.

The pin connector assembly 48 includes an elongated pin member 62. More specifically, the pin member 62 is provided with a cyclindrical pin body portion 64 which is a cyclindrical shaft having an upper head portion 66 of a size larger than the connector holes 52 to prevent the movement therethrough.

As noted in FIG. 7, the pin member 62 is inserted through the connector holes 52 and the connector openings 60 so as to pivotally connect the respective ear piece support members 35, 37 to the main frame assembly 20. The resilient dimple portions 54 are operable to initially resist pivotal movement of the respective ear piece support members 35, 37 from one usage position to another.

In a second embodiment of the reversible eyeglass structure 12 of this invention, a new and different hinge connector assembly 68 is shown in FIGS. 9–14, inclusive. More specifically, the hinge connector assembly 68 is provided with the frame connector assembly 44 and the ear piece connector assembly 46; and an intermediate connector assembly 47 to pivotally connect the frame connector assembly 44 to the ear piece connector assembly 46.

The frame connector assembly 44 is provided with upper and lower connector lugs 69, 70. The connector lugs 69, 70 are each provided with a main body section 71 having connector holes 72 therethrough. The outer ends of the connector lugs 69, 70 are provided with frame cam surfaces 74 operable in a manner to be explained.

The ear piece connector assembly 46 is provided, at the connector sections 40 of each ear piece support members 35, 37, with parallel spaced lugs 76, each having an outer end pivotal with tapered or arcuate shaped cam surfaces 78. Each of the support lugs 76 is provided with a connector opening 79 aligned with an adjacent one thereof to receive a portion of the pin connector assembly 48 therein as will be explained.

The intermediate connector assembly 47 includes a main hinge member 81. The main hinge member 81 is provided with a main body 82 having parallel, intermediate support lugs 84 at one end thereof and parallel adjacent anchor holes 86. The intermediate support lugs 84 are provided with aligned openings 85 to receive the pin connector assembly 48. The adjacent anchor holes 86 are operable to receive connector members therein as will be explained.

The pin connector assembly 48 is provided with (1) a pin member 62 to be extended through aligned connector openings 79 and the aligned openings 85, and (2) a pair of dowel support members 88.

The pin member 62 is provided with a pin body portion 64 and a head portion 66 and operable in a manner similar to the previously described embodiment. The dowel support members 88 are preferably constructed of a resilient material such as rubber so as to allow deflection of the ear piece support members 35, 37 when moved from one usage position to the other as will be explained.

Figure 11:
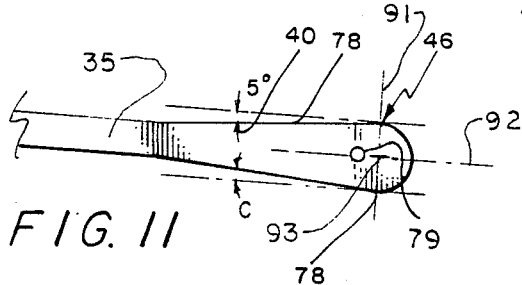
FIG. 11 is a fragmentary top plane view of a connector section of an earpiece support member of the second embodiment of the reversible eyeglass structure of this invention.
Figure 12:
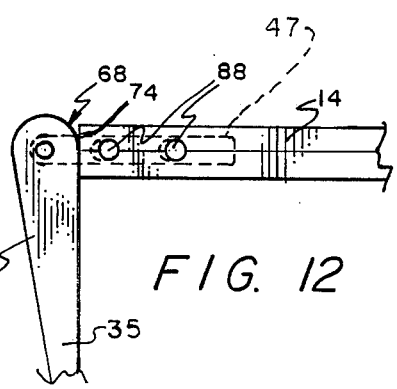
FIGS. 12, 13, and 14 are fragmentary top elevational views illustrating the operation of the hinge connector assembly of the second embodiment of the reversible eyeglass structure of this invention.
Figure 13:
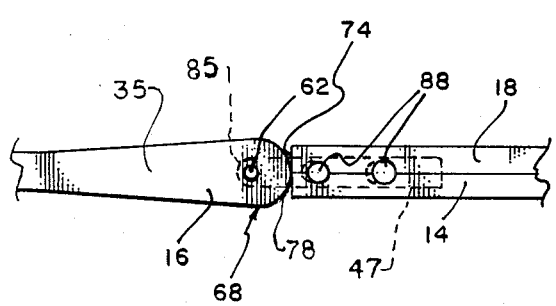
Figure 14:
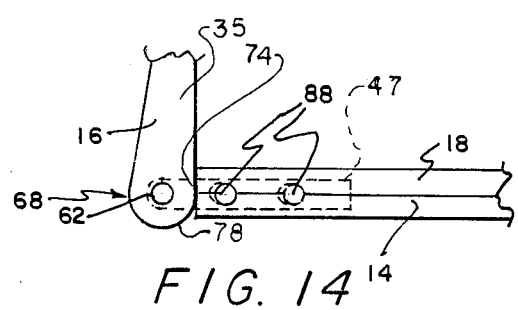

As noted in FIG. 11, the connector opening 79 is positioned to the left of a vertical axis 91 on a horizonal axis 92 of each respective ear piece support members 35, 37 in this embodiment to receive a positive biasing the the usage positions noted FIGS. 12 and 14 in a manner to be explained. The intersection of the axes 91 and 92 indicated at 93 is the center of the radius of the cam surfaces 78. The maximum biasing force from the resilient dowel members 88 is achieved at the transition position shown in FIG. 13.

USE AND OPERATION OF THE INVENTION

In the use and operation of the reversible eyeglass structure 12 of this invention, a front elevational view is shown in FIG. 1 whereupon the same resembles a conventional eyeglass frame assembly with the respective ear piece support members 35, 37 pivotally connected thereto. In this configuration, the ear piece support members 35, 37 are pivoted inwardly towards each other in a conventional manner for purposes of conveyance and storage.

It is to be noted that the eyeglass frame assembly 14 and the ear piece support assembly 16 are both provided with half frame sections 32 so as can be made of various colors and designs to achieve the reversible feature of this invention. This feature, with other structural elements to be noted therein, provides for the dual application of the reversible eyeglass structure 12 of this invention so that the outer surface of the half frame sections 32 can be red when the ear piece support members 35, 37 are in one direction and, of a different color such as white, or the like, when reversed 180 degrees as noted by the movement of the ear piece support assembly 16 in FIG. 8.

As noted in the embodiment of FIGS. 1–7, inclusive, the hinge connector assembly 18 is operable with the resilient dimple portions 54 to resist movement of the ear piece support members 35, 37 when passing over the dimple portions 54. The resilient dimple portions 54 are operable to hold the ear piece support members 35, 37 in the usage conditions which lie in a common plane and perpendicular to the main frame assembly 20 as noted in FIG. 8.

In another embodiment of this invention as shown in FIGS. 9–14, inclusive, a different hinge connector assembly 68 is provided having the intermediate connector assembly 47. More specifically, the respective ear piece support members 35, 37 are connected to the eyeglass frame assembly 14 by the use of the intermediate connector assembly 47 and the resilient dowel support members 88 as noted in FIG. 9.

As noted in FIG. 11, the aligned connector opening 79 in the ear piece connector assembly 46 is operable to receive the pin member 62 therethrough. The resilient dowel support members 88 are extended through the aligned anchor holes 86 and connector holes 72, 86 for reasons to be explained.

As noted in FIG. 12, the ear piece support members 35 and 37 are held in a usage position. The dowel support members 88 are deformed as noted in FIG. 10. This provides a resilient bias thus forcing the cam surface 78 against the outer end of the frame cam surface 74. This tends to hold the ear piece support members 35, 37 in usage positions as shown in FIGS. 12 and 14 under bias of the resilient dowel support members 88.

As noted in FIG. 13, on movement of the ear piece support member 35 ninety (90) degrees from that shown in FIG. 12, the respective dowel support members 88, being of a rubber resilient material, are further deformed to allow movement. On completing the movement a full 180 degrees as shown in FIG. 14, it is seen that the dowel support members 88 are still slightly deformed to provide a resilient force to hold the tapered cam surface 78 against the frame cam surface 74 as noted in FIG. 14.

It is seen that both of the hinge connector assemblies 18, 68 of this invention provided for a means of holding the respective ear piece support members 35, 37 in the usage condition but permit 180 degrees pivotal movement as noted in FIG. 8. The hinge connector assembly 68 further provides for a resilient means to bias the ear piece support members 35, 37 in their usage condition which is extended perpendicular to longitudinal axis of the eyeglass frame assembly 14.

It is noted that the reversible eyeglass structure of this invention is operable on reversing the ear piece support members 180 degrees to provide a generally different or variable outward appearance. For example, the half sections of which the eyeglass frame assembly and the ear piece support assembly allows a different appearance thereof when the user views in different directions through the glass sections and the ear piece support members are pivoted 180 degrees from one usage position to another.

Of course, the half sections of the frame structure can be of a floral design or the like but basically provides two different appearing eyeglass assemblies in one reversible eyeglass structure to provide multiple usage and savings in cost.

The reversible eyeglass structure of this invention is attractive in appearance; easy to reverse from one usage condition to another; provided with connector means to hold the structure in the different usage conditions; sturdy in construction; substantially maintenance free; and economical to manufacture.

While the invention has been described in conjunction with preferred specific embodiments thereof, it is to be understood that this description is intended to illustrate and not to limit the scope of the invention, which is defined by the following claims.

I claim:

1. A reversible eyeglass structure operable in one of two usage positions to present a variable different outward appearance, comprising:
   (a) an eyeglass frame assembly;
   (b) an ear frame support assembly having spaced, ear piece support members;
   (c) a hinge connector assembly to pivotally connect said ear piece support members to said eyeglass frame assembly so as to be movable 180 degrees from one usage position to another; and
   (d) said hinge connector assembly includes a support lug having a dimpled portion to engage said ear piece support members and bias same toward the usage position.

2. A reversible eyeglass structure as described in claim 1, wherein:
   (a) said eyeglass frame assembly and said ear piece support members being of layered construction have different appearances on opposite sides thereof so that said ear piece support members can be pivoted 180 degrees relative to said eyeglass frame assembly to provide a variable outward appearance in cooperation with the complementary side of said eyeglass frame assembly and said ear piece support members.

3. A reversible eyeglass structure as described in claim 1, wherein:
   (a) said eyeglass frame assembly having a lens support frame and a nose bridge member having outer surfaces extended in common planes so said eyeglass frame assembly can be viewed through and worn from opposite directions.

4. A reversible eyeglass structure as described in claim 1, wherein:
   (a) said hinge connector assembly includes an intermediate connector assembly having resilient support members to bias said ear piece support members into engagement with said eyeglass frame assembly.

5. A reversible eyeglass structure as described in claim 1, wherein:
   (a) said ear piece support members each having a connector opening off-set from an outer radius on a longitudinal axis thereof to bias said ear piece support members into engagement with said eyeglass frame assembly.

6. A reversible eyeglass structure operable to be worn in one of two usage conditions to provide a different outward appearance, comprising:
   (a) an eyeglass frame assembly having a main frame assembly;
   (b) an ear piece support assembly having a pair of spaced ear piece support members pivotally connected to said eyeglass frame assembly by a hinge connector assembly;
   (c) said eyeglass frame assembly and said ear piece support assembly constructed of opposed parallel surfaces of different colors and/or designs so as to be usable as reversible and worn in the two usage conditions;
   (d) said hinge connector assembly having a cooperating frame connector assembly engagable with an ear piece connector assembly so as to provide a means for holding said ear piece support members in either of two usage conditions being perpendicular to said eyeglass frame assembly and pivotal from one usage position to other; and
   (e) said hinge connector assembly includes a support lug having a dimple portion to engage said ear piece support members and bias same toward the usage positions.

* * * * *